(12) United States Patent
Burton et al.

(10) Patent No.: US 6,222,081 B1
(45) Date of Patent: Apr. 24, 2001

(54) CATALYSTS SUITABLE FOR DECREASING THE COLD FILTER PLUGGING POINT OF MIDDLE DISTILLATES

(75) Inventors: Jeremy Burton, Helsby (GB); Paolo Falchi, Milan (IT)

(73) Assignee: Societa' Italiana Additivi Per Carburanti S.r.l., Pescara (IT)

( * ) Notice: Subject to any disclaimer, the term of this patent is extended or adjusted under 35 U.S.C. 154(b) by 0 days.

(21) Appl. No.: 08/990,027

(22) Filed: Dec. 12, 1997

(30) Foreign Application Priority Data

Dec. 12, 1996 (IT) ............................................. MI96A2606

(51) Int. Cl.$^7$ ....................................................... C10L 1/16
(52) U.S. Cl. ................ 585/12; 585/10; 585/13; 44/459
(58) Field of Search .................. 585/10, 12, 13; 44/459

(56) References Cited

FOREIGN PATENT DOCUMENTS

WO91/11488  *  8/1991  (WO) .

* cited by examiner

Primary Examiner—Bernard Lipman
Assistant Examiner—R. Rabago
(74) Attorney, Agent, or Firm—Arent Fox; Kintner Plotkin Kahn PLLC

(57) ABSTRACT

Ethylene copolymers with alpha-olefins utilizable as additives to increase the properties of middle distillates at low temperatures, obtainable by polymerization in the presence of catalysts comprising the reaction product between:

1) a bis-cyclopentadienyl derivative having the general formula:

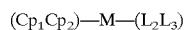

containing groups with oxygen bound to the transition metal, wherein

M is a metal from the IIIb group to the IIb group or of the lanthanides series of the periodic table of the elements;

2) a co-catalyst chosen from alumoxanes or boranes.

13 Claims, No Drawings

CATALYSTS SUITABLE FOR DECREASING THE COLD FILTER PLUGGING POINT OF MIDDLE DISTILLATES

The present invention relates to liquid hydrocarbons compositions, for instance gasoils, generally known as middle distillates.

It is known that the middle distillates contain alkanes which at low temperatures tend to precipitate under the form of waxes as high size crystals. In this way gel structures are formed which cause the middle distillates fluidity loss. Therefore there are problems of storage, transfer and feeding the middle distillates through pipes, pumps and moreover obstruction phenomena of the line filters and of those of the propulsors feeding lines occur.

These problems are well known in the art and for the definition of cold behaviour, the middle distillates are characterized from the physical point of view with the following features determined according to various standard methods: Cloud Point (C.P.), Pour Point (P.P.), Cold Filter Plugging Point (C.F.P.P.), Wax Antisettling (W.A.S.) etc.

Various additives, some of them in the market, having selective and/or multifunctional uses are known in the art, capable of improving the above mentioned cold features of middle distillates. The additives generally have the purpose of modifying the wax crystals formed at low temperatures both reducing the sizes and modifying the form thereof. Indeed the crystals with reduced sizes give less problems of filters blockage. A further property required by additives is that to maintain in suspension the formed crystals, that is to obtain the result to have a reduced sedimentation rate. Also this effect prevents the filters blockage at low temperatures, particularly it reduces the storage on the tanks bottom during storage of middle distillates in the refinery.

The additives known in the art to overcome such drawbacks are generally polymeric of various types used singly or under the form of physical mixtures.

See for instance the patent application WO 91/11488 which claims the combination of some of the additives mentioned above with (co)polymers of ethylene with alpha-olefins, in particular ethylene/propylene copolymers obtainable by polymerization of ethylene with alpha-olefins in the presence of catalysts based on a) coordination organometallic compounds which are cyclopentadienyl derivatives of a metal of the Group 4b of the Periodic Table and comprise mono-, di-cyclopentadienyl and their derivatives of the transition metal, with b) alumoxanes, which are the reaction products of trialkyl aluminium with water. The ethylene/alpha-olefins copolymers obtained have the essential feature to have at least 30% of the polymeric chains with terminal ethenylidene or ethenyl unsaturations. These copolymers can be combined with one or more additives known in the art having the property of improving the middle distillates characteristics at low temperatures.

Ethylene/alpha-olefins copolymers suitable for the same purposes are also known in the art, see U.S. Pat. No. 5,097,084, which are characterized by the substantial absence of linking inversions of propylene as shown by the parameters $X_2$ and/or $X_4$ lower than or equal to about 0.02, determined by $^{13}C$ NMR according to the method described by J. C. Randal in "Macro-molecules" 11, 33 (1978). The ethylene/propylene copolymers having said values of the mentioned parameters clearly show better CFPP values than the copolymers in which said values are not present, for instance vanadium-based catalysts.

Copolymers of ethylene or alpha-olefins, or unsaturated esters, for instance vinylacetates, with maleic or fumaric acid, or unsaturated monocarboxylic acid esters, for instance acrylates, are also known in the art. Copolymers of ethylene/vinylacetate (EVA), fumarates, propionates, etc., can be mentioned. See for instance the patents U.S. Pat. No. 3,661,541, U.S. Pat. No. 4,211,534, EP 153,176, EP 153,177. Also various combinations of the described copolymers are indicated in these patents, optionally in combination with a nitrogen polar compound.

It has been surprisingly and unexpectedly found by the Applicant that certain particular ethylene alpha-olefins (co) polymers show improved properties when are used as additives to improve the middle distillates properties at low temperatures. In particular the copolymers of the invention show improved C.F.P.P values.

It is an object of the present invention copolymers of ethylene with one or more alpha-olefins from 3 to 20 carbon atoms, preferably 3 to 8 C, utilizable as additives to improve the middle distillates properties at low temperatures, obtainable by polymerization of the monomers in the presence of catalysts comprising the reaction product among:

1) a bis-cyclopentadienyl derivative of general formula:

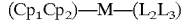

containing groups with oxygen bound to the transition metal, wherein

M is a metal from the group IIIb to the group IIb, preferably IV group, or of the lanthanides series of the Periodic Table; $Cp_1$ and $Cp_2$ equal to or different from each other represent the following groups bound to M with delocalized π bonds, in particular with an eta 5 bond when the groups are chosen from cyclopentadiene, indene, fluorene or derivatives thereof, substituted in the case of indene and fluorene also with the hydrogenated phenyl ring (rings) and with substituents both in phenyl and cyclopentadienyl rings, also with heteroatoms; or with π bonds for instance in the case of cyclooctatriene; or said groups $Cp_1$ $Cp_2$ constrained with M by a bivalent linking bridge, for instance —R— type wherein R is an alkylene, preferably from 1 to 4 carbon atoms, —Si(R')$_2$— wherein R' is an alkyl from 1 to 10 C atoms, preferably from 1 to 6 carbon atoms; or an aryl optionally containing heteroatoms, such as O, N, or alkylaryl or arylalkyl from 7 to 20 carbon atoms; $L_2$ or $L_3$ equal to or different from each other represent a group $OR_a$ wherein $R_a$ is an aryl group, optionally the carbon atoms of the ring being substituted by heteroatoms, and optionally containing substituents for instance of alkyl type from 1 to 10 carbon atoms, with 2) a cocatalyst selected from the compounds represented by the following formulas:

2a) alumoxane, having the general formula:

under the form of cyclic compound or under the form of linear polymeric compound of formula

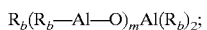

alumoxane is generally a mixture of the two mentioned forms;

$R_b$ is an alkylic group from 1 to 5 C atoms, preferably methyl, m is an integer from 1 to 30, preferably from 4 to 20;

m' is an integer from 3 to 20, preferably from 4 to 20;

2b) $(L_1—H)^+(A)^-$ wherein (A)⁻ is a compatible non coordinate anion, preferably (B Q_q)— wherein $L_1$ is a neutral Lewis basis, $(L_1—H)^+$ is a Bronsted acid,

B is an element of the group from IIIa up to VIa of the Periodic Table with metalloidic characteristics, preferably boron, phosphor or arsenic in the valence 3 or 5, silicon, more preferably boron in the valence 3;

Q, equal to or different from each other, are chosen from the following groups: hydrides, halides, alkyls, aryls optionally substituted, for instance with halogens, preferably F, alkoxides, aryloxides, dialkylamido, or $R_0COO$— wherein $R_0$ ranges from 1 to 20 carbon atoms, with the proviso that Q can be equal to halide only once, q is an integer equal to the valence of B plus 1. The preferred co-catalyst component 2) is 2b).

The alumoxane compound 2a) of the catalytic system is preferably prepared by reaction of trimethyl aluminium and water, obtaining a mixture of linear and cyclic compounds. They are generally prepared by putting into contact a solution of trialkyl aluminium with water in suitable organic solvents, for instance aliphatic hydrocarbons.

As known, aluminoxanes are compounds containing Al—O—Al bonds, having molar ratio ranging between O/Al, obtainable in the art by reaction, under controlled conditions, of an alkyl aluminium, or alkyl aluminium halide, with water and, in the case of trimethyl aluminium, also with an hydrate salt, such as hexahydrate aluminium sulphate, pentahydrate copper sulphate and pentahydrate iron sulphate.

The molar ratio between Al of the component 2b alumoxane with respect to the amount of the metal of component 1 (metallocene) is comprised between 10000:1 and 100:1, preferably between 5000:1 and 500:1. In the case of the boron compound the ratio ranges from (0.1–4):1 and preferably from (0.5–2.0):1.

Preferred examples of the compound 2b) have the general formula $(L_1—H)^+(B Q_4)^-$ wherein the $L_1$ and Q meanings are indicated above, B is the boron in the valence 3. $L_1$ can be $NH_3$, aniline, pyridine, quinoline, alkylamines, dialkylamines, trialkylamines with the alkyl from 1 to 8 carbon atoms, preferably from 1 to 4, phenylamines, etc. All these compounds can form quaternary ammonium salts, pyridinium salts, quinolinium salts, which represent $(L_1—H)^+$. Exemplifying compounds which can be mentioned are the following:
substituted ammonium trialkyl salts, for instance triethylammonium tetraphenylborate, tripropylammonium tetraphenylborate, tris(n-butyl) ammoniumtetraphenylborate, trimethylammoniumtetrakis (p-tolyl)borate, tributylammonium tetrakis(pentafluorophenyl)borate, tripropylammoniumtetrakis (2,4-dimethylphenyl) borate, tributylammonium tetrakis(3,5-dimethylphenyl)borate, triethylammonium tetrakis (3,5-ditrifluoromethylphenyl)borate etc.

The N,N-dialkyl anilinium salts can be also used, such as for instance N,N-dimethyl anilinium tetraphenylborate, N,N-diethyl aniliniumtetraphenylborate, N,N-2,4,6-pentamethylanilinium tetraphenylborate etc.; dialkyl ammonium salts such as di-(i-propyl)ammoniumtetrakis (pentafluorophenyl)borate, dicyclohexylammonium tetraphenylborate etc.; triaryl phosphonium salts such as triphenylphosphonium tetraphenylborate, tri (methylphenyl) phosphonium tetrakis pentafluorophenylborate, tri (dimethylphenyl) tetraphenylborate phosphonium etc.

Non limitative examples of compound 1 which can be used for preparing the cation complex are derivatives of titanium, zirconium, vanadium, hafnium, chromium, lanthanium, etc., the titanium or zr compounds are preferred. Examples which can be mentioned are: bis(eta 5 cyclopentadienyl) Zr diphenate; bis (eta 5 cyclopentadienyl) Zr 2,3,6-trimethylphenate, bis (eta 5 cyclopentadienyl) Hf diphenate, bis tetramethylcyclo-pentadienyl Zr diphenate, etc.

The catalysts of the present invention are obtainable for instance by direct reaction of biscyclopentadienyl metal dialkyl, preferably dimethyl, with the corresponding phenols. This reaction gives substantially quantitative yields. The corresponding phenol can be utilized in excess since it can act as reaction solvent. Other solvents are for instance cyclohexane, methylcyclohexane, hexane, diethylether, benzene, toluene, etc. This preparation method is illustrated as an example in the examples reported hereinafter.

The polymerization to obtain the copolymers of the invention can be carried out by operating with the suspension technique, in inert diluent, or in gaseous phase, with temperatures generally ranging from 0° C. to 150° C. at a pressure generally ranging from 1 to 3000 bar, preferably 1 to 300 bar, optionally by employing a molecular weight regulator, for instance hydrogen.

The catalysts of the invention are generally employed in ethylene and alpha-olefins polymerization and copolymerization processes.

This kind of catalysis is described for other kinds of metallocenes in the patent application WO 93/08221, incorporated herein by reference. The modifications of component 1), 2a) and 2b) indicated in said WO '221 can be applied also to the catalysts of the invention with the proviso that $L_2$ and $L_3$ have the meaning of the present invention. In this patent application there is a detailed description of all the various kinds of bonds which can be utilized.

As said above, the (co)polymers of the invention surprisingly show improved CFPP values with respect to the ethylene/propylene copolymers known in the art.

Moreover the ethylene/alpha-olefins (co)polymers of the present invention are characterized by having the inversions, as defined above, $X_2$ and/or $X_4$ lower than 0.02 (or lower than 2%).

In particular, according to the present invention, the (co)polymers obtained by utilizing as catalyst component 1) in combination with component 2b) are preferred. The (co)polymers obtained are characterized by having a number of terminal ethenylidene or ethenyl unsaturations lower than 30%, in particular they are in the range of 5–20%.

The physical characteristics measurements of the middle distillates are carried out by determining the following parameters: Cloud Point (C.P.), Pour Point (P.P.) and Cold Filter Plugging Point (C.F.P.P.) as defined in the ASTM D2500-81; ASTM D97-66 and IP 309/83 standards, respectively.

The molecular weights determination (both number average Mn and weight average Mw) is carried out by GPC (Gel Permeation Chromatography) which gives also the molecular weights (MWD) distribution. See for instance W. W. Yau et al "Modern Size Exclusion Liquid Chromatography", John Wiley and Sons, N.Y. 1979.

The intrinsic viscosity (dl/g) is measured according to known methods, for instance in tetraline at 135° C. The viscosimetry molecular weight Mv can be calculated by utilizing methods of the intrinsic viscosity well known in the art. See for instance: L. H. Tung, "Fractionation of Synthetic Polymers" Ed. Marcel Dekkers Inc. N.Y. 1977, J. Polymer Sci 20, 495–506, 1956; G. Moraglio, Chim. Ind. (Milano) 10 984, 1959.

The preferred number average molecular weights (Mn) are generally comprised between 300–50000, preferably between 800–15000, more preferably between 1500–10000, still more preferably between 1500–5000.

The molecular weights distribution is generally in the range of 1.5–3.0 and more preferably 1.5–2.5.

The middle distillate free from additives utilized in the tests, has the following characteristics:

| | |
|---|---|
| I.B.P. (initial boiling point) | 170.2° C. |
| f.b.p. (final boiling point) | 355.2° C. |
| 90%–20% vol. | 101° C. |
| f.b.p. - 90% vol. | 21° C. |
| C.P. | −4° C. |
| C.F.P.P. | −8° C. |
| P.P. | −12° C. |

The methods for determining the ethylene-propylene sequences distribution, in particular the $X_2$ and $X_4$ inversions are well known in the art and can be determined by 130 NMR as indicated in the patent U.S. Pat. No. 5,097,084 incorporated herein by reference.

The percentage of terminal unsaturations of ethenylidene type —$CR^{1\prime}$=$CH_2$, wherein $R^{1\prime}$ is an alkyl from 1 to 8 C atoms, or ethenyl type —CH=$CH_2$ can be determined by IR (FTIR), or by titration or by $^{13}C$ NMR.

The amount of propylene and alpha-olefins in the polymers of the invention is generally comprised between 15–60% by weight, preferably between 20–55% by weight, more preferably 30–47% and still more preferably 30–37%.

As said, the (co)polymers of the invention can be combined with other cold flow improvers (CFI) known in the art to obtain synergistic effects both as regards CFPP and the filterability and the WAS effect. As known CFI according to the present invention, ethyl-vinylacetates, fumarates, acrylates, propionates, are preferably used. Preferably in order to obtain a superior synergistic effect the (co)polymers of the invention are combined with the CFI indicated above and moreover also with a third CFI chosen from nitrogen polar compounds.

The known CFI briefly described are the following:

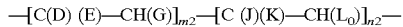

wherein $D=R_t$, $COOR_t$, $OCOR_t$, $R^2_tCOOR_t$, or $OR_t$, $E=H$, $CH_3$, D, or $R^2_t$, G=H or D $J=H$, $R^2_t$, $R^2_tCOOR_t$, or an aryl or heterocyclic group, $K=H$, $COOR^2_t$, $OCOR^2_t$, or $OR^2_t$, or COOH, $L=H$, $R^2_t$, $COOR^2_t$, $OCOR^2_t$, COOH, or aryl, $R_t \geq C_{10}$ $R^2_t \geq C_1$, and $m_2$ and $n_2$ represent the molar ratios, $m_2$ comprised between 1–0.4, and $n_2$ comprised between 0–0.6.

The polymer can contain also units deriving from other monomers.

These polymers can be copolymers of maleic anhydride or maleic acid, or fumaric acid and of another ethylenically unsaturated monomer, for instance an alpha-olefin or an unsaturated ester, for instance vinyl acetate. Molar ratios between comonomers comprised between 2:1 and 1:2 can be used. Examples of olefins which can be copolymerized for instance with maleic anhydride, comprise 1-decene, 1-dodecene, 1-tetradecene, 1-hexadecene and 1-octadecene.

The copolymer can be esterified with any suitable technique and it is preferred that the maleic anhydride or the fumaric acid be esterified for at least 509. Examples of alcohols which can be used comprise n-decan-1-ol, n-dodecan-1-ol, n-tetradecan-1-ol, n-hexadecan-1-ol, and n-octadecan-1-ol. The alcohols can comprise up to one methylic substituent for chain, for instance 1-methylpentadecan-1-ol, 2-methyltridecan-1-ol. The alcohol can be a mixture of linear alcohols and branched with a single methyl. Each alcohol can be used to esterify copolymers of maleic anhydride with any olefin. It is preferred to use pure alcohols rather than the alcohol mixtures available on the market, but if mixtures are used, $R^2_t$ refers to the average number of carbon atoms in the alkylic group, if alcohols containing a branch in the first or in the second position are used, $R^2_t$ refers to the bearing segment of the alcohol linear chain. When mixtures are used, it is important that no more than 15% of the $R^2_t$ groups have the value $R^2_t+2$. The choice of the alcohol clearly depends on the choice of the copolymerized olefin with maleic anhydride, so that $R_t+R^2_t$ is within the range from 18 to 38. The preferred value of $R_t+R^2_t$ can depend from the fuel boiling characteristics wherein the additive is to be used.

These polymers can be also fumarates polymers and copolymers for instance as those described in the European patent applications 153,176 and 153,177. Other suitable polymers are the polymers and copolymers of alpha-olefins and esterified copolymers of styrene and of maleic anhydride, and esterified copolymers of styrene and fumaric acid.

Other (co)polymers which can be utilized are ethylene copolymers with an ester of an unsaturated monocarboxylic acid. The ester can be an ester of an unsaturated carboxylic acid with a saturated alcohol or, preferably, an ester of a saturated carboxylic acid with an unsaturated alcohol.

Examples of the former are methyl acrylate, ethyl acrylate, butyl acrylate, methyl methacrylate, ethyl methacrylate, butyl methacrylate, lauryl acrylate, isopropyl acrylate and isobutyl acrylate. Examples of the latter are vinyl acetate, propionate, butyrate and isobutyrate. The preferred copolymer is a copolymer ethylene vinyl acetate.

The copolymer advantageously contains from 10 to 50%, preferably at least 25% by weight of the ester.

The number average molecular weight of the copolymer of the unsaturated ethylene ester is advantageously at least 7500, and more preferably in the range from 850 to 4000, preferably from 1250 to 3500 and more preferably about 3000 as measured by vapour phase osmometry.

The linear polymers derived from alkylene, for instance ethylene, oxides, for instance polyethylenglycol esters, and their amino derivatives, can also be used.

Alternatively the copolymer can be an ethylene/α-olefin, advantageously with a number average molecular weight of 7500 at most, preferably from 2000 to 5000, as measured by vapour phase osmometry.

Suitable α-olefins are those mentioned above, with reference to the component (a), or styrene, still preferred propylene. The ethylene content is advantageously from 50 to 65% by weight although for the ethylene-propylene copolymers up to 80% ethylene can be advantageously used.

The third additive CFI, nitrogen polar compound, indicated above, which is preferable to be used in combination with the above mentioned CFI and the (co)polymers of the invention, and generally the nitrogen polar compounds are generally aminic salts or amides formed by reaction of at least a molar part of a substituted hydrocarbide with a molar ratio of hydrocarbon acid having from 1 to 4 groups of carboxylic acid and an anhydride thereof; esters/amides can also be used containing from 3 to 300, preferably from 50 to 150, total carbon atoms. These nitrogen compounds are described in U.S. Pat. No. 4,211,534 herein incorporated by reference. Suitable amines are usually long chain $C_{12}$–$C_{40}$ primary, secondary, tertiary or quaternary amines or mixtures thereof, but shorter chains can be used if the resulting nitrogen polar compound is soluble in oil; it will usually contain about 30 to 300 total carbon atoms. The nitrogen polar compound preferably contains at least an alkylic segment of linear chain $C_8$ $C_{24}$.

Suitable amines comprise primary, secondary, tertiary or quaternary amines, but are preferably secondary amines. Tertiary and quaternary amines only form amine salts.

Examples of amines comprise tetradecyl amine, cocoamine, and hydrogenated tallow amine. Examples of secondary amines comprise dioctadecyl amine and methyl behenyl amine. Amine mixtures are also suitable and many amines derived from natural materials are mixtures. A preferred amine is a secondary hydrogenated tallow amine of formula $HNR_3R_4$ wherein $R_3$ and $R_4$ are alkylic groups derived from hydrogenated tallow fats composed of approximately 4% of $C_{14}$, 31% of $C_{16}$, 59% of $C_{18}$.

Examples of suitable carboxylic acids (and anhydrides thereof) to prepare these nitrogen compounds comprise dicarboxylic cyclohexane acid, dicarboxylic cyclohexene 1,2 acid, cyclopentane-1,2 dicarboxylic acid and naphthalendicarboxylix acid. Generally, these acids will have about 5–13 carbon atoms in the cyclic moiety. Preferred acids are benzen dicarboxylic acids such as phthalic acid, isophthalic acid and terephthalic acid. The phthalic acid or its anhydride is particularly preferred. The particularly preferred compound is the amido-amine salt formed by reacting a molar part of phthalic anhydride with two molar parts of dihydrogenated tallow amine. Another preferred compound is diamide formed by the dehydration of this amide amine salt.

Advantageously, the composition comprises the polymeric component (a), a polymer selected from the component b) (i) and a compound selected from the component b (ii), the nitrogen polar compound. In addition, the composition can optionally comprise other additives for combustible oils, many of them are used in the art or are known in the prior art. The additive concentration of the present invention, alone or in combination with the other CFI indicated above, to be utilized in middle distillates, ranges from 10 ppm–5000 ppm, preferaly 50–900 ppm. The ratios by weight between the copolymer of the invention, the known CFI and the nitrogen polar compound are the following: 10/1:10/1:10, preferably 10/1:5/1:5.

The following experimental data are reported for better illustrating the invention.

EXAMPLE 1
Synthesis of Zirconocene Bisphenoxide (Catalyst 1)

In a flask containing 50 ml of toluene, 1.988 millimoles of dimethyl zirconocene were dissolved. Successively under stirring 3.976 millimoles of phenol were added. The solution develops methane according to the reaction:

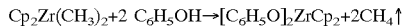

The process was carried out at room temperature and is quantitative. After about 4 hours of stirring, the solution was dried and the solid was characterized by $^1H$ NMR: the spectrum shows the Cp peak and all the series of the hydrogen peaks of the two phenyls.

$Cp_2Zr(O—C_6H_5)_2$: $^1H\delta$=5.94 (s,10 H, Cp), 6.75–7.29 (m, 10 H, $C_6H_5$).

EXAMPLE 2
Synthesis of the Zirconocene Bis 2,4,6 Trimethyl Phenoxide (Catalyst C2)

In a flask containing 50 ml of toluene 1.988 millimoles of zirconcene dimethyl were dissolved. Successively 3.976 millimoles of 2,4,6 trimethyl phenol were added under stirring. The solution developed methane according to the reaction:

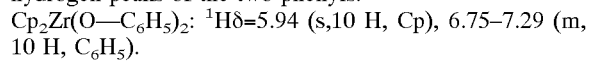

The yield is almost quantitative. The substance was kept under reflux at 110° C. for about 10 hours, then it was dried and the solid washed with hexane. The compound is characterized by $^1H$ NMR:
the spectrum shows the Cp signal, of the four methyls in ortho and of the two in para to the oxygen and all the peaks of the phenyl hydrogens.
$Cp_2Zr[O-2,4,6(CH_3)_3C_6H_2]_2$:$^1H$ $\delta$=5.93 (s,10 H, Cp), 2.24 (s, 12 H, p-$CH_3$), 2.26 (s, 6 H, O—$CH_3$) 6.80 (s, 4H, $C_6H_2$)

EXAMPLE 3
Synthesis of the Zirconocene Bis 2,6 Dimethylphenoxide (Catalist C3)

In a flask containing 50 ml of toluene 1.988 millimoles of dimethyl zirconocene were dissolved. Successively 3.976 millimoles of 2,6 dimethyl phenol were added under stirring. The solution develops methane according to the reaction:

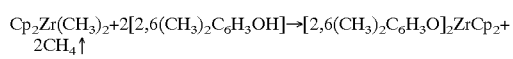

The reaction is almost quantitative. The solution was kept under reflux at 110° C. for 10 hours, then dried and the solid was characterized via $^1H$ NMR:
the spectrum shows the Cp peak, the one of the four equivalent methyls and the peaks of the aromatic hydrogens:
$Cp_2Zr[O-2.6(CH_3)_2C_6H_3]_2$: $^1H$ $\delta$=5.89 (s,10H, Cp), 2.23 (s, 12H, $CH_3$), 6.76 (t, 2H, $C_6H_3$), 6.97 (d, 4H, $C_6H_3$).

EXAMPLE 4
Synthesis of the Zirconocene Bis 4-Terbutylphenoxide (Catalyst C4)

In a flask containing 50 ml of toluene 1.988 millimoles of dimethyl zirconcene were dissolved. Successively 3.976 millimoles of 4-terbutylphenol were added under stirring. The solution develops methane according to the reaction:

$Cp_2Zr(CH_3)_2$+2 4-t.$BuC_6H_4OH$→[4-t.Bu $C_6H_4O]_2$ $ZrCp_2$+2 $CH_4\uparrow$ The reaction is almost quantitative. The solution was kept under reflux at 110° C. for about 3 hours, then dried and the solid was characterized via $^1H$ NMR:
$Cp_2Zr[O-4$ t.$BuC_6H_4]_2$: $^1H$ $\delta$=6.10 (s, 10H, Cp), 1.35 (s, 18H, $CH_3$), 6.82 (d, 4H, $C_6H_4$), 7.8 (d, 4H, $C_6H_4$).

EXAMPLE 5
(Comparative) Synthesis of the Catalyst: $(Me)_2SiCp_2ZrCl_2$

The synthesis is carried out according to the procedure reported in the art C. S. Bajgur, W. R. Tikkanen, J. I. Petersen, Inorg. Chem. 2539, 24 (1985).

In a 1 l flask equipped with bubbles refrigerant and magnetic stirrer, 700 ml of toluene, 8 g (0.20 moles) of metal potassium (previously washed with pentane and cut in thin flakes) and 25 ml (0.30 moles) of fresh distilled CpH (non substituted cyclopentadiene) are introduced.

The reaction is carried out in nitrogen atmosphere and at the boiling temperature of the toluene (about 110° C.) for 8 hours.

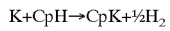

The precipitate is separated by centrifugation and is washed with toluene. It is then dried at reduced pressure.

In a reactor equipped with external jacket for cooling and with magnetic stirrer, 60 ml of tetrahydrofurane (THF) and 1.58 g (0.015 moles) of CpK are introduced.

At the temperature of −60° C., 1.03 ml (0.0075 moles) of $(CH_3)_2SiCl_2$ are added dropwise.

The reaction is carried out for one hour at −60° C., it is left then under stirring for further two hours until the room temperature is reached

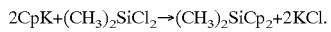

It is filtered and the solution is transferred in another reactor with external jacket for the subsequent reaction.

In this reactor, at the temperature of −80° C., 10.41 ml (0.011 moles) of a solution of lithium butyl (LiBu) 1.6 M in hexane are added dropwise.

The temperature is kept at −80° C. for 30 minutes and then it is brought to room temperature in 2 hours

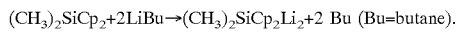

In the same reactor of the previous reaction, at the temperature of 0° C., 1.36 g (0.0057 moles) of $ZrCl_4$ previously dissolved in 10 ml of dimethoxyethane are added very slowly.

The reaction is carried out at 0° C. for one hour and 30 minutes, then at room temperature for further 30 minutes.

The obtained solution is heated up to boiling for 2 hours.

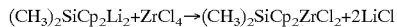

It is dried under reduced pressure obtaining a brown precipitate. It is solubilized in toluene and is then filtered. The filtrate is dried under vacuum obtaining a solid precipitate which is furtherly purified by extraction with pentane.

EXAMPLE 6
(Preparation of the Compound 2b)) Synthesis of Dimethy-lanilinium Tetra(Perfluorophenyl)Borate ($BNF_4$)

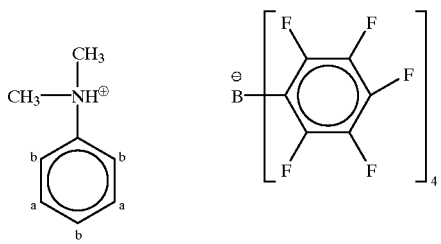

This compound was synthetized according to the following art:
J. A. Ewen, et al, Macromol. Chem., Macromol. Symp. 48/49, 253 (1991).

In a 100 ml flask, 1.98 g (2.88 millimoles) of lithium tetra(perfluorophenyl)borate dissolved in 20 ml of methylene chloride are introduced. To this solution 1.05 g (6.66 millimoles) of N,N-dimethylaniline chlorohydrate dissolved in 10 ml of methylene chloride are added. The lithium chloride precipitates, it is filtered and the solution is dried. A white paste is formed which is washed more times in pentane until a white solid is obtained. The yield is about 71%.

EXAMPLE 7
Preparation of the Compound 2a)) Synthesis of Methylalu-moxane (MAO)

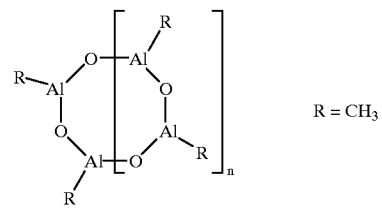

MAO is prepared as reported by the following art: EP 208 561, Chem Abstr., 106, 120391 g (1988).

The reaction of the MAO formation is the following:

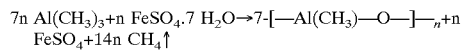

The amounts of the reactants are:
$FeSO_4 \cdot 7 H_2O = 14.62$ g ($5.26 \cdot 10^{-2}$ moles)
$Al(CH_3)_3 = 18.02$ g (0.250 moles)

In a 500 ml flask the heptahydrate iron sulphate and 125 ml of toluene are introduced; a solution of 25 ml of triethyl aluminium is added in 65.5 ml of toluene previously prepared in a 250 ml flask. The addition is made by means of a dropping funnel at a temperature of −8° C. and must be such as to introduce 2 ml/min of solution. The flask has, as a precaution, a bubbles refrigerant. When the addition is over, the reaction proceeds by stirring for 1 h at 8° C., for an additional hour at 0° C. and then it is left for about 17 hours at room temperature. By filtration on porous septum and under vacuum distillation of the toluene and of unreacted $Al(CH_3)_3$, 7.5 g of MAO are obtained (the yield with respect to $Al(CH_3)_3$ is 529). A 10% MAO solution is then prepared in toluene.

EXAMPLE 8
Polymerization Carried Out with Catalyst 1

The reactor utilized is an AISI 316 steel autoclave (5 liter volume) equipped with magnetic stirrer and capable of operating at ≦150 bar pressure.

The autoclave is equipped with 4 feeding inlets, an outlet and a water circulating cooling system.

The reactor is purified more times with anhydrous hot nitrogen and kept under pressure at 120° C. for 24 hours.

From the purification temperature the autoclave is cooled at 25° C. by keeping the nitrogen pressure at 1 bar. 50 ml of MAO (in solution at 10% in toluene), 250 ml of distilled toluene are introduced in sequence, and then under stirring 166 g of liquid propylene.

It is heated to 80° C. and when this temperature is reached, the pressure is 14 bar.

At this point 10 mg of $Cp_2Zr$(bisphenoxide) in solution of 100 ml of toluene are added under nitrogen pressure. Then 5 bar of gaseous ethylene are introduced.

The polymerization is carried out for 8 minutes by keeping the pressure constant by continuous feeding of ethylene.

The process is quickly stopped by depressurizing and cooling at 25° C.

The polymer is precipitated with ethanol acidified with hydrochloric acid, washed more times with ethanol and dried under vacuum.

380 g of polymer containing 24% by weight of propylene are obtained.

EXAMPLE 9
Polymerization Carried Out with Catalyst 1

Example 8 is repeated but with the following changements: it is used 10 ml of MAO (in solution at 10% in toluene), 200 ml of distilled toluene, the ethylene pressure=3 bar.

200 g of polymer containing 50% by weight of propylene are obtained.

EXAMPLE 10
Polymerization Carried Out with Catalyst 2

Example 8 is repeated but with the following changements: it is used 40 ml of MAO (in solution at 10% in toluene), 200 ml of distilled toluene and 15 mg of $Cp_2Zr$ bis(2,4,6 trimethylphenoxide) in 100 ml of toluene.

250 g of polymer containing 27% by weight of propylene are obtained.

EXAMPLE 11
Polymerization Carried Out with Catalyst 2

The procedure of Example 9 is repeated by utilizing 5 mg of $Cp_2Zr$ bis (2,4,6 trimethylphenoxide) in 270 ml of distilled toluene. The added MAO is equal to 10 ml (10% solution in toluene).

The polymerization process is carried out for 15 minutes obtaining 150 g of polymer containing 47% of propylene.

EXAMPLE 12
Polymerization with Catalyst 1 and Co-Catalyst of Example 6 (BNF,)

The reactor utilized and the relevant operating procedures are those already described in Example 8.

250 ml of distilled toluene with 0.7 ml of triethyl aluminium and, under stirring, 230 g of liquid propylene were introduced in sequence.

It is heated at 80° C. and when this temperature is reached the pressure is 12 bar. At this point a solution of 20 mg $Cp_2Zr(OC_6H_5)_2$ (catalyst C1) and 39.3 mg of N,N' dimethytlaniliniumtetra (perfluorophenyl) borate ($BNF_4$) in 50 ml of toluene under nitrogen pressure is added. Then, 3 bar of ethylene are introduced.

The polymerization is carried out for 6 minutes by maintaining the pressure constant by continuous ethylene feeding.

The process is quickly stopped by depressurizing and cooling at 25° C.

The polymer is precipitated from toluene with ethanol acidified with hydrochloric acid, washed more times with ethanol and dried under vacuum.

100 g of polymer containing 34% by weight of propylene are obtained.

The polymer results completely soluble in hexane.

EXAMPLE 13
(Comparative) Polymerization Carried Out with the Catalyst of Example 5 (Comparative) with Co-Catalyst Mao The reactor and the relevant operating procedures are those already described in Example 8.

20 ml of MAO (in solution at 10% in toluene), 180 ml of distilled toluene and, under stirring, 166 g of liquid propylene are introduced in sequence.

It is heated to 100° C. and when this temperature is reached the pressure is 19 bar.

At this point a 100 ml solution of toluene containing 2 mg of $Me_2SiCp_2ZrCl_2$ is added under nitrogen pressure. Then 3 bar of gaseous ethylene are introduced.

The polymerization is carried out for 8 minutes by maintaining the pressure constant by continuous ethylene feeding.

The process is quickly stopped by depressurizing and cooling at 25° C. The polymer is precipitated from toluene with ethanol acidified with hydrochloric acid, washed more times with ethanol and dried under vacuum.

130 g of polymer containing 39* by weight of propylene are obtained.

EXAMPLE 14
(Comparative) Polymerization with the Catalyst of Example 5 (Comparative) and as Cocatalyst Mao The reactor and the relevant operating procedures are those already described in Example 5.

250 ml of distilled toluene with 0.7 ml of triethyl aluminium and, under stirring 240 g of liquid propylene axe introduced in sequence.

It is heated to 80° C. and when this temperature is reached the pressure is of 12 bar.

At this point a solution of 20 mg of the catalyst of Ex. 5, 50 ml of toluene containing the same molar ratio of MAO of Example 13 are introduced under nitrogen pressure. Then 3 bar of gaseous ethylene are introduced.

The polymerization is carried our for 8 minutes by maintaining the pressure constant by continuous ethylene feeding.

The process is quickly stopped by depressurizing and cooling at 25° C.

The polymer is precipitated from toluene with ethanol, washed more times with ethanol and dried under vacuum.

128 g of polymer containing 44% by weight of propylene are obtained.

EXAMPLE 15

Example 1 has been repeated but using an equal molecular amount of 2,4,6trimethylphenol instead of phenol.

The process was carried out at the same temperature under a stirring time of about 4 hours.

The solution was dryed and the solid was characterized by $^1H$ NMR.

The results are:

$^1$NMR: 5.93 (s, 10H,Cp), 2.24 (s,12H,O—$CH_3$), 2.26 (s,6H,p,$CH_3$), 6.92 (s,2H,$C_6H_2$).

EXAMPLE 16

Example 1 has been repeated but by using $Cp_2H_f(CH_3)_2$ instead of $Cp_2Z_2(CH_3)_2$ in the same molar ratio.

The process was carried out at the same temperature under a stirring time of about 4 hours.

The solution was dryed and the solid was characterized by $^1H$ NMR.

The results are:

$^1H$ NMR: 5.95 (s,10H,Cp), 6.75–7.29 (m,10H,$OC_6H_5$).

EXAMPLE 17

The polymerization was carried out by using the catalyst of example 15.

The reactor utilised and the conditions and procedures are the same as in example 12 but instead of $CP_2Z_r(OC_6H_5)_2$ were used ten miligrams of $CP_2Z_r(OC_6H_5Me_3)_2$, and then 3 bar (instead of 5 bar of example 8) of ethylene were introduced.

The polymerization was carried out for ten minutes by maintaining the pressure constant by continuous ethylene feeding.

The process was quickly stopped by de-pressuring and cooling at 25° C.

The polymer was precipitated from toluene with ethanol acidifyed with hydrocloric acid; washed more times with ethanol and dryed under vacuum.

Mw resulted to be almost the same as Mv.

% unsaturations have been determined by iodometric titration as mentioned in the description;

CFPP have been measured according to IP 309/83 by using a middle distillate free from additives having the charateristics reported in the description.

TABLE 1

| Ex. | Yield Kg pol/g Metal · h | $C_3$ (% wt) | $X_2$ | $X_4$ | $\eta$ dl/g | Mv | % unsaturations | CFPP(ppm) 10 | 20 | 30 | 40 | 50 | 100 | 200 | 300 | 700 |
|---|---|---|---|---|---|---|---|---|---|---|---|---|---|---|---|---|
| 8 | 1305 | 24 | 0.008 | 0.009 | 0.14 | 3634 | 63 | −11 | −11 | −11 | −12 | −12 | −13 | −13 | −15 | −15 |
| 9 | 690 | 50 | 0.004 | 0.016 | 0.13 | 3262 | 90 | | | | | −13 | −14 | −14 | | |
| 10 | 690 | 27 | 0.004 | 0.007 | 0.12 | 2990 | 70 | | | | | −12 | −13 | −14 | | |
| 11 | 1268 | 47 | 0.004 | 0.016 | 0.03 | 494 | 96 | | | | | −11 | −13 | −13 | | |
| 12 | 220 | 34 | 0.003 | 0.006 | 0.32 | 11409 | 10 | −10 | −12 | −12 | −12 | −12 | −15 | −17 | −18 | −22 |
| 13 Comp. | 1395 | 39 | 0.003 | 0.011 | 0.09 | 2504 | 90 | −11 | −11 | −12 | −12 | −13 | −14 | −13 | −14 | −16 |
| 14 Comp. | 120 | 44 | 0.006 | 0.009 | 0.15 | 4279 | 50 | −10 | −11 | −11 | −12 | −12 | −13 | −14 | −13 | −15 |
| 17 | 100 | 30 | 0.001 | 0.003 | 0.12 | 2950 | 12 | | | | | −13 | −14 | −16 | | |
| 18 | 80 | 32 | 0.001 | 0.001 | 0.72 | 34625 | 11 | | | | | −12 | −14 | −14 | | |

The polymer obtained was 15 g containing 30% by weight of propylene and an efficiency of 100 Kg Polymer/(g Zr·h).

The polymer resulted to be completely soluble in n-heptane.

EXAMPLE 18

It was followed the same polymerization conditions of example 17 but: by using $Cp_2Hr(OC_6H_5)_2$ instead of $Cp_2Zr(OC_6H_5)$, in the same molar ratio. The polymer obtained was 56 g containing 32% by weight of propylene and an efficiency of 80 Kg Polymer/ (g Hf·h). The polymer resulted to be completely soluble in n-heptane.

In Table 1 there are reported the characterization of the various copolymers:

$C_3$ (% by wt) indicates the % by weight of propylene in the copolymer;

$X_2$ and $X_4$ are the $^{13}C$ NMR data determined as indicated in the description;

the viscosity (dl/g) has been determined through measurements in tetraline at 135° C. as said in the description;

Mv has been calculated according to the methods given in the description;

Mw and MWD have been determined by GPC according to the method of the description;

MWD in the catalysts of the Examples in Table 1 are the following:

| Ex. | MWD |
|---|---|
| 8 | 2.0 |
| 9 | 2.1 |
| 10 | 2.2 |
| 11 | 1.9 |
| 12 | 2.0 |
| 17 | 2.1 |
| 18 | — |

EXAMPLES 19, 20, 21

EP copolymers (component a)) of exs. 12, 15 and 16 were dissolved in three different dosing rates (50 ppm, 100 ppm, 200 ppm) in the same middle distillate of Table 1; the CFPP results are the reported in Table 2.

TABLE 2

| | % $C_3$ | CFPP (° C.) | | | |
|---|---|---|---|---|---|
| Ex. | (by wt) | 0 ppm | 50 ppm | 100 ppm | 200 ppm |
| 12 | 34 | −7 | −12 | −15 | −17 |
| 18 | 32 | −7 | −12 | −14 | −14 |
| 17 | 30 | −7 | −13 | −14 | −16 |

The above copolymers (component a)) were blended with a polar compound (component b)) a diamide of maleic acid (obtained by reaction of 2 moles of tallow amine with 1 mole of maleic anhydride and dehydrating the mixture by heating to about 150° C. for 8 hours).

The tallow amine is a commercially available product sold by Akzo and designed as ARMEEN 2HT.

The CFPP results are the reported in Table 2.

TABLE 3

| | | | CFPP (° C.) | | |
|---|---|---|---|---|---|
| Ex. | EP (a) | Polar (b) | 50 ppm | 100 ppm | 200 ppm |
| 12 | 1 | 0 | −12 | −15 | −17 |
| 19 | 3 | 1 | −13 | −16 | −18 |
| 18 | 1 | 0 | −12 | −14 | −14 |
| 20 | 3 | 1 | −13 | −15 | −16 |
| 17 | 1 | 0 | −13 | −14 | −16 |
| 21 | 3 | 1 | −14 | −15 | −17 |

The data show that the CFPPs of the blend a+b are improved by operating at the same overall dosing rates and with the same middle distillate.

What is claimed is:

1. In a method for decreasing the cold filter plugging point of middle distillates, the improvement comprising adding thereto ethylene copolymers obtained by polymerizing ethylene and alpha olefin monomers in the presence of catalysts comprising the reaction product of:

1) a bis-cyclopentadienyl having the formula:

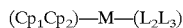

containing groups with oxygen bound to a transition metal, wherein

M is a metal from group IIIb to the group IIb or of the lanthanides series of the periodic table; $Cp_1$ and $Cp_2$, are equal to or different from each other and are selected from the following groups bound to M, with an eta 5 bond: cyclopentadiene, indene, fluorene and derivatives thereof, substituted in the case of indene and fluorene by one or more hydrogenated phenylic rings and with substituents both in the phenylic and cyclopentadienylic rings, also with heteroatoms; or with π bonds for cyclooctatriene; or said groups $Cp_1$ and $Cp_2$ constrained with M by a bivalent linking bridge —R—, wherein R is an alkylene of from 1 to 4 carbon atoms, —Si(R')$_2$— wherein R' is an alkyl of from 1 to 10 carbon atoms; or an aryl optionally containing the heteroatoms O and N, or alkylaryl or arylalkyl of from 7 to 20 carbon atoms;

$L_2$ or $L_3$, are equal to or different from each other and represent an $OR_a$ group wherein $R_a$ is an aryl group, optionally the carbon atoms of the ring are substituted by heteroatoms, and optionally containing alkylic substituents from 1 to 10 carbon atoms with 2) a co-catalyst having the formula $(L_1—H)^+(BQ_4)^-$ wherein $(L_1—H)^+$ is a Bronsted acid, B is boron in the valence 3;

Q is equal to or different from each other, and it is selected from the group consisting of: hydrides, halides, alkyls, and aryls optionally substituted with halogens, alkoxides, aryloxides, dialkylamido, or $R_0COO—$, wherein $R_0$ has from 1 to 20 carbon atoms, with the proviso that Q can be equal to halide only once.

2. The method according to claim 1 wherein the molar ratio between component 2 with respect to the metal of component 1 (metallocene) is comprised between (0.1–4):1.

3. The method according to claim 1 wherein the compounds 2 are unsubstituted ammonium trialkyl salts, selected from the group consisting of triethylammonium tetraphenylborate, tripropylammonium tetraphenylborate, tris (n-butyl) ammonium tetraphenylborate, trimethylammonium tetrakis (p-tolyl)borate, tributylammonium tetrakis (pentafluorophenyl)borate, tripropylammonium tetrakis (2,4-dimethylphenyl) borate, tributylammonium tetrakis (3,5-dimethylphenyl)-borate, and trimethylammonium tetrakis (3,5-ditrifluoromethylphenyl) borate.

4. The method according to claim 1 wherein compounds 1) are derivatives of titanium, zirconium, vanadium, hafnium, chromium and lanthanum.

5. The method according to claim 4 wherein wherein compounds 1) are titanium or zirconium derivatives.

6. The method according to claim 5 wherein compounds 1) are selected from the group consisting of bis (eta 5 cyclopentadienyl) Zr diphenate; bis(eta 5 cyclopentadienyl) Zr 2,3,6-trimethylphenate, and bis tetramethylcyclopentadienyl Zr diphenate.

7. The method according to claim 1 wherein the copolymer is characterized by having the linking inversions of propylene as shown by the parameters $X_2$ and/or $X_4$ less than 0.02.

8. The method according to claim 1 wherein the number of terminal ethelylidene or ethenyl unsaturations is lower than 30%.

9. The method according to claim 8, wherein the number of terminal ethenylidene or ethenyl unsaturations is lower than 20%.

10. The method according to claim 1 wherein the amount of alpha olefins is comprised between 15–60% by weigh.

11. The method of claim 1 wherein the copolymers are used in combination with at least one other cold flow improver.

12. The method according to claim 11 wherein the cold flow improvers are selected from the group consisting of ethylvinylacetates, fumarates, acrylates and propionates, optionally in the presence of additional cold flow improvers selected from the nitrogen polar compounds.

13. The method according to claim 12 wherein the ratios by weight between the copolymer, one or more additional cold flow improvers and the nitrogen polar compound is as follows: 10/11:10/1:10.

* * * * *